United States Patent [19]
Cormier

[11] 3,922,779
[45] Dec. 2, 1975

[54] CABLE STRIPPER
[76] Inventor: Joseph T. Cormier, 1130 Main St., Tewksbury, Mass. 01876
[22] Filed: Oct. 29, 1974
[21] Appl. No.: 518,459

[52] U.S. Cl. .................................. 30/90.8; 30/91.1
[51] Int. Cl.² .................. B21F 13/00; B26B 27/02
[58] Field of Search .......... 30/90.4, 90.8, 91.1, 91.2

[56] References Cited
UNITED STATES PATENTS

| | | | |
|---|---|---|---|
| 756,857 | 4/1904 | Hutchings | 30/91.1 |
| 2,187,215 | 1/1940 | Spinello | 30/91.2 X |
| 2,220,631 | 11/1940 | Yagel | 30/90.4 |
| 2,234,013 | 3/1941 | Stover | 30/90.4 X |
| 2,329,805 | 9/1943 | Wilson | 30/90.4 |
| 2,380,725 | 7/1945 | Crowder | 30/91.1 |
| 2,903,064 | 9/1959 | Blonder | 30/90.4 X |
| 3,613,235 | 10/1971 | McCormick | 30/91.1 |
| 3,624,901 | 12/1971 | Pettit et al. | 30/90.4 |

*Primary Examiner*—Al Lawrence Smith
*Assistant Examiner*—J. T. Zatarga
*Attorney, Agent, or Firm*—Charles R. Fay

[57] ABSTRACT

A cable stripper which comprises a blade having a sharp point and a divergent cable guide thereon in combination with a pivoted cable holding member mounted on the cable guide, the cable holding member being pivoted intermediate its ends, one end having a flange for holding the cable to the cutting point in the guide, and the opposite end having a thumb or fingerpiece. The blade may or may not have an additional sharpened edge for cutting and stripping and the cable holder may be placed on the cable guide for right or left handed operation.

5 Claims, 5 Drawing Figures

U.S. Patent  Dec. 2, 1975  3,922,779
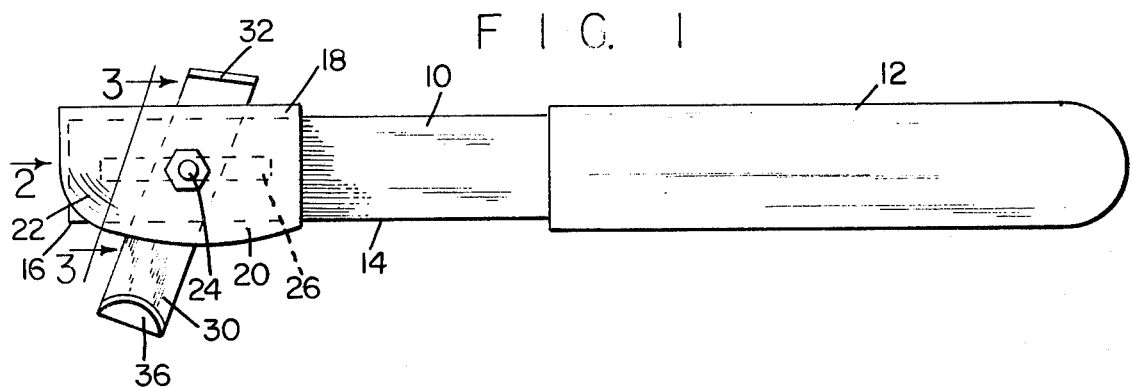
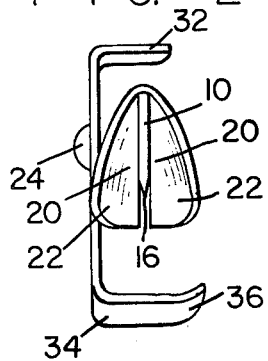
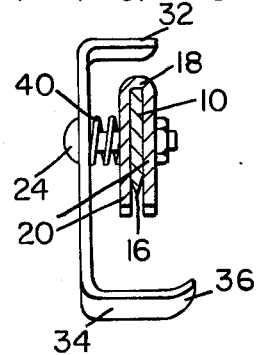
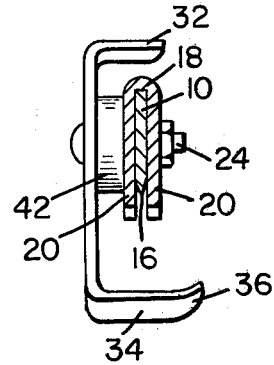
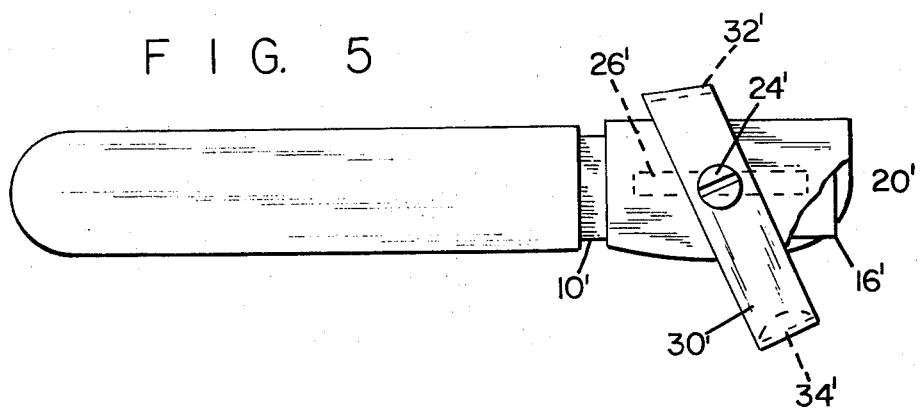

CABLE STRIPPER

BACKGROUND OF THE INVENTION

The usual manner of stripping wires on the job is with a jacknife and this is of course a relatively dangerous procedure. Insulation cutters and strippers have been proposed but they have always been open to certain objections. In most of these devices it is necessary to use a separate knife to cut off the unwanted insulation and in some cases the devices are also somewhat dangerous to use and in general are unhandy to operate, particularly on the job.

In the present case a holder for the cable is also mounted on the guide for holding the cable safely without possibility of injuring the hand of the operator.

SUMMARY OF THE INVENTION

A cable guide for a stripper is mounted on a blade similarly to the structure disclosed in my copending application Ser. No. 494,560, filed Aug. 5, 1974. The blade may be relatively elongated and have a sharp edge extraneous of the cable guide for cutting or to strip the insulation on the inner wires, or it may be a very short blade having only a forward cable stripper sharp point, but in any event the blade is provided with a handle.

Mounted on the cable guide by means passing through the blade there is provided in this invention a cable holder which is pivoted intermediate its ends. One end is provided with a thumb or fingerpiece for positioning the cable holder and at its opposite end there is a cable holding flange which holds the cable in position during stripping so that the knife edge is never close to the fingers of the operator. The guide itself is held in fixed but adjustable position on the blade but the cable holder is picoted e.g., on a stud passing through the blade so that the cable holder swings freely back and forth and frictionally engages the cable and holds it in the correct position so that all the operator has to do is to place the cable in the cable guide and pull.

Alternatively a spring may be used to hold the cable holder and in this case the cable holder will remain in position on the guide until moved forward by the cable motion or back and forth manually. The adjustment of the guide provides for thinner or deeper cuts when stripping the cable. The device is very easy to use and much safer because the cable is held to the cutter for the stripping by reason of the cable holder and not by the fingers. This new device is simple and inexpensive and can utilize an already existing knife blade with very slight modifications thereof, to strip non-metallic sheathed cable.

BRIEF DESCRIPTION OF THE DRAWINGS

FIG. 1 is a view in side elevation illustrating a form of the invention;

FIG. 2 is a view in end elevation looking in the direction of arrow 2 in FIG. 1;

FIG. 3 is a cross sectional view on line 3—3 in FIG. 1;

FIG. 4 is a view similar to FIG. 3 showing a modification; and

FIG. 5 is a view in elevation illustrating a modification.

PREFERRED EMBODIMENT OF THE INVENTION

As shown in FIG. 1 a knife blade 10 having a handle 12 and provided with a sharp edge 14 and a sharp cutting terminal point 16 is utilized for the purposes of the description of this modification. The cable guide itself is generally indicated at 18 and comprises a pair of generally flat members 20, 20 placed at the sides of the knife blade 10 at the forward portion thereof and covering the forward portion thereof with the possible exception of the sharp point 16. The plates 20, 20 deverge and flare out forwardly as shown at 22, 22, for the reception of the cable more or less in the manner as disclosed and described in my copending application above identified.

The cable guide 18 can be mounted on the knife blade 10 by means of a stud 24 located in a slot 26 so that the same may be adjusted for lighter or deeper cuts, with relation of point 16 of blade 10. At the same time the stud 24 may also rotatably mount the cable holder 30 or the cable holder 30 may be mounted on a separate stud should this be desired.

Cable holder 30 comprises an elongated member pivoted intermediate its ends as for instance e.g., on stud 24 has at its upper end at the back edge of the knife, a relatively small flange 32 for manual manipulation by the operator. At its opposite end it has a cable holding larger flange 34 which may have an inturned end 36 to better hold the cable.

In the operation of the device the cable is slipped under the cable holding flange 34 and it may then be necessary to move the cable holder slightly to engage the cable holder flange 34 therewith, whereupon with the other hand the operator merely pulls the cable or the knife in a direction to slit the cable outer covering. Usually a slight contact between the cable holding flange 34 and the cable is sufficient to cause a frictional contact which holds the cable in the position required for penetrating the cable covering enough to slice it, but if a lighter or deeper penetration is desired then the bolt on the stud 24 is merely loosened and the knife blade is adjusted relative to the combined cable guide and cable holder.

There are two forms of the invention. In FIG. 3 for instance the stud 24 is provided with a spring 40 between the cable holder 30 and the adjacent plate 20 forming a portion of the cable guide, and when this spring is used the cable holder will remain in any position it is put until moved forwardly by the cable or back and forth manually as desired.

In the case of FIG. 4 however a spacer is used, this spacer being indicated at 42 and being located between the adjacent plate 20 of the cable guide and the cable holder 30. In this case the cable holder is freely swingable. Some users may prefer this type of device which is in some respects easier to use.

Also it is to be noted that the cable holder 30 may be placed at either side of the cable guide for right or left hand operation.

In FIG. 5 there is shown a similar construction in which the knife blade 10' does not have a sharp edge for cutting, but only at the stripping point 16', and thus the blade may be shorter and the entire tool shorter and more compact, but otherwise the parts are the same as above described and are so indicated as by plates 20', cable holder 30' with flange 34', and manual operating flange 32' mounted on a stud 24' located in the slot 26' in the blade 10'.

I claim:

1. A cable stripper comprising a generally straight blade having a sharp edge, said blade having a cable slitting point at an end of the blade for slitting a cable longitudinally, a handle on the other end of the blade, a cable guide mounted on the blade in close association with the slitting point for guiding the cable as it moves longitudinally relatively with respect to said point, wherein the guide comprises a flared member at each side of the blade, said flared members extending away from the slitting point at each side thereof, and a cable holder mounted on said blade, said cable holder being pivotable in a plane parallel to said blade thereon and including an offset end facing the slitting point and the cable guide, said offset end being adapted to engage the cable holding it in position in said guide and in stripping position with respect to said slitting point as the latter and cable guide move longitudinally, relatively with respect to the cable.

2. The cable stripper of claim 1 including an offset manually operable flange at the opposite end of the cable holder.

3. The cable stripper of claim 1 wherein said guide and cable holder are adjustable relative to the slitting point.

4. The cable stripper of claim 1 wherein the cable holder is freely pivotable.

5. The cable stripper of claim 1 including a resilient member between the cable guide and the cable holder tending to hold the latter in position.

* * * * *